W. H. FIREBAUGH, Jr.
FUEL CONTROL FOR SEMI-DIESEL ENGINES.
APPLICATION FILED JULY 5, 1918.

1,402,408.

Patented Jan. 3, 1922.
4 SHEETS—SHEET 3.

INVENTOR
W. H. Firebaugh, Jr.
BY Strong & Townsend
his ATTORNEYS

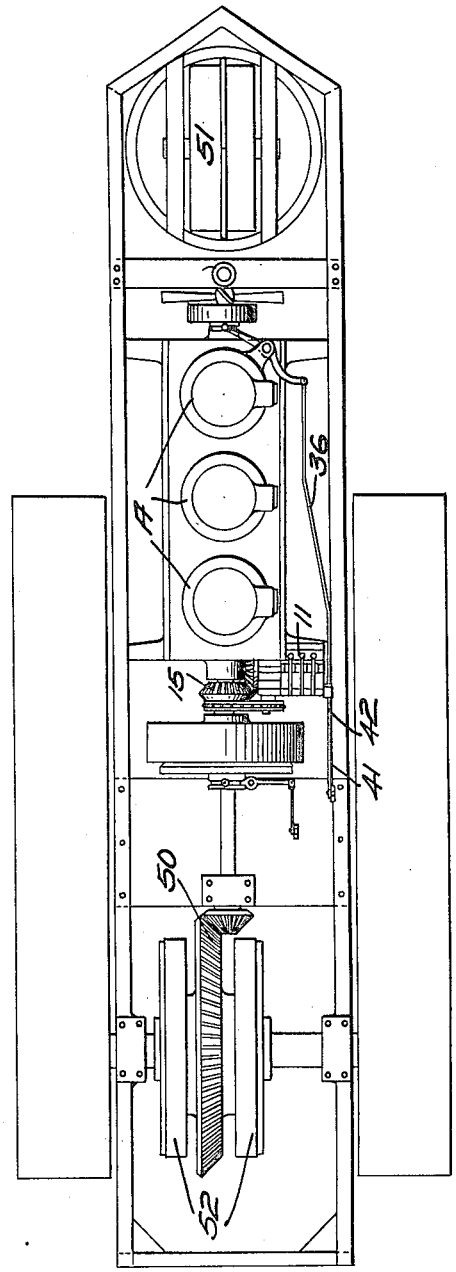

UNITED STATES PATENT OFFICE.

WILLIAM H. FIREBAUGH, JR., OF BERKELEY, CALIFORNIA.

FUEL CONTROL FOR SEMI-DIESEL ENGINES.

1,402,408. Specification of Letters Patent. Patented Jan. 3, 1922.

Application filed July 5, 1918. Serial No. 243,357.

*To all whom it may concern:*

Be it known that I, WILLIAM H. FIREBAUGH, Jr., a citizen of the United States, residing at Berkeley, in the county of Alameda and State of California, have invented new and useful Improvements in Fuel Controls for Semi-Diesel Engines, of which the following is a specification.

This invention relates to a semi-Diesel engine, and particularly to a series of controls therefor to render an engine of this character adaptable for traction engine use.

Semi-Diesel engines, although extensively employed for marine and stationary work, have proven a failure for portable and traction engine use. This is due to several causes, among which may be particularly mentioned, the difficulty encountered when attempting to idle the engine, and also the time lost in starting and the fire danger caused by the necessity of preheating the hot bulbs by which ignition is maintained.

The object of the present invention is to overcome the difficulties above named, first, by providing means for starting the engine without resorting to the necessity of preheating the hot bulbs, secondly, to provide means for idling the engine, said means comprising a manually and automatically controlled mechanism for regulating the amount of fuel oil injected, and also a manually controlled mechanism for regulating the time of injection.

Another object of the invention is to provide means for reversing the engine to eliminate the necessity of employing reversing gears in the transmission of the tractor. Further objects will hereinafter appear.

The invention consists of the parts and the construction and combination of parts as hereinafter more fully described and claimed, having reference to the accompanying drawings in which—

Fig. 5 is a section through the pawl showing its construction.

Fig. 6 is a plan view of the pawl.

Fig. 7 is a plan view of a tractor showing the application of the engine.

Figure 1:
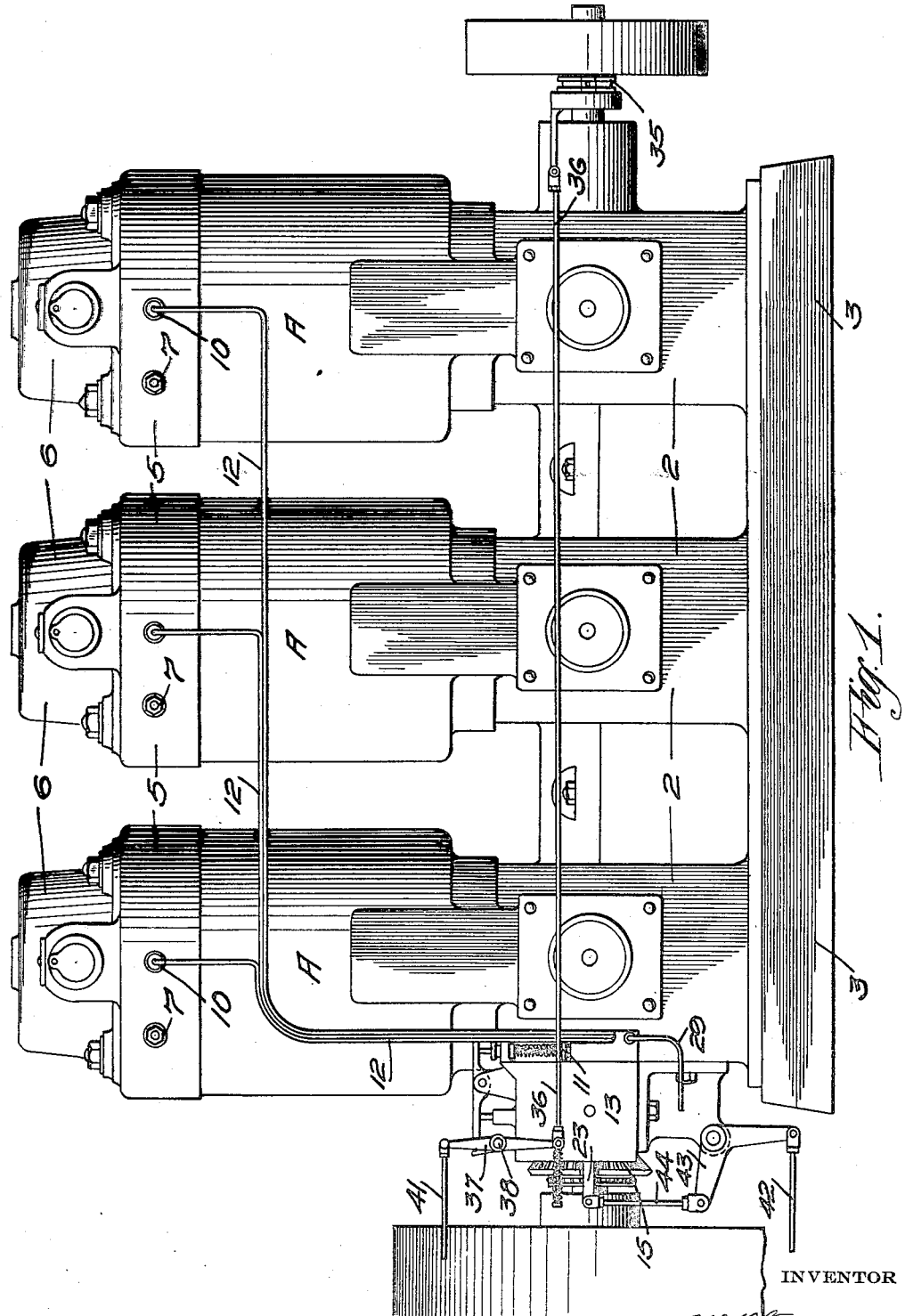
Figure 1 is a side elevation of the engine showing the application of the invention.
Figure 2:
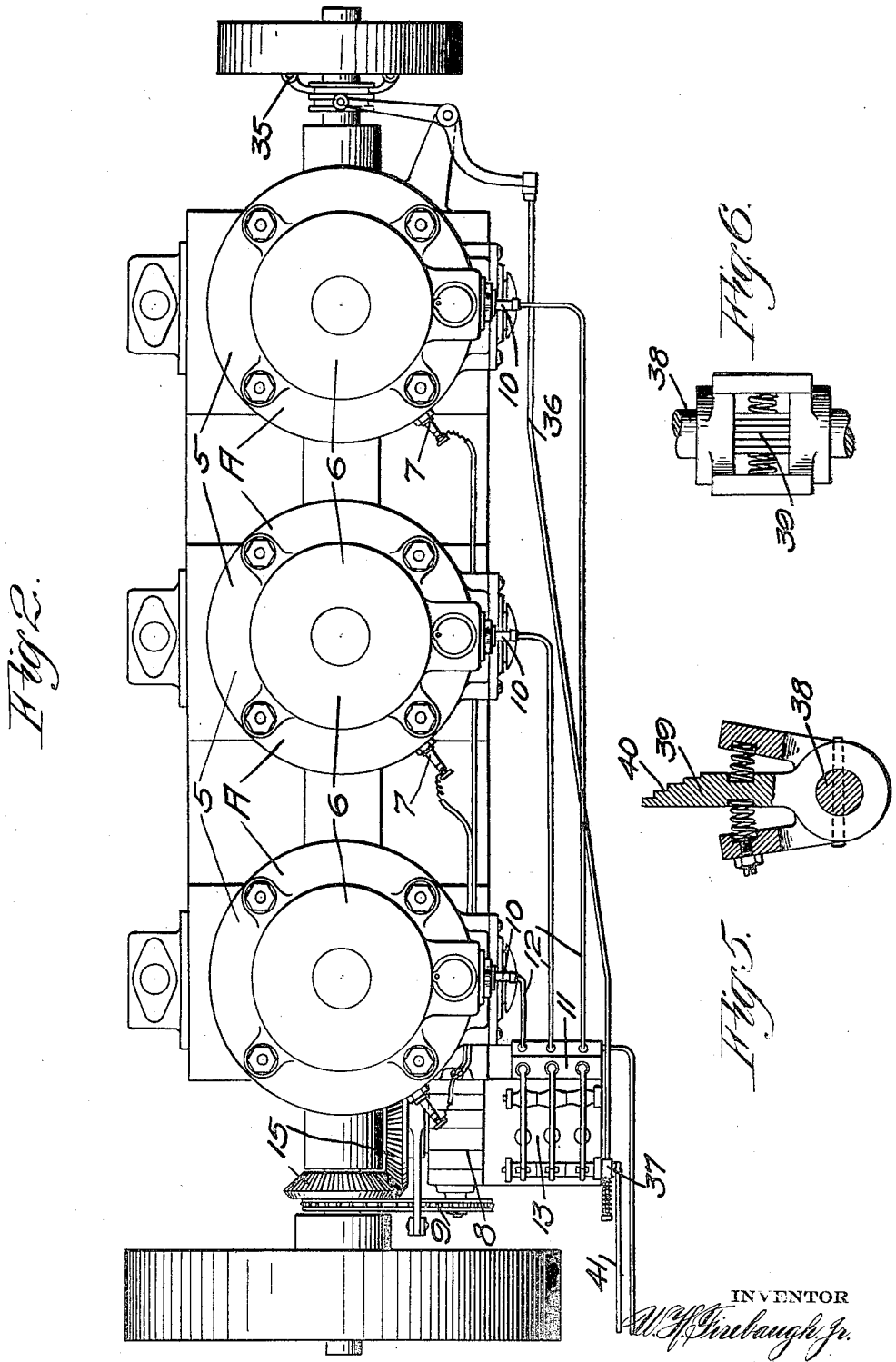
Fig. 2 is a plan view of the engine.

Referring to the drawings in detail, A indicates the cylinders of a multiple cylinder semi-Diesel engine, 2 the crank shaft casing, 3 the base, 4 the crank shaft, 5 the cylinder heads, 6 the hot bulbs, and 7 a spark plug, one for each cylinder, said spark plugs being, in the present instance, connected with a magneto 8, which is driven directly from the crank shaft 4 by a chain drive 9 as here shown. Attached to the upper end of each cylinder is a spray or injection nozzle 10, and connecting each nozzle with a fuel pump 11 is a pipe 12.

Figure 4:
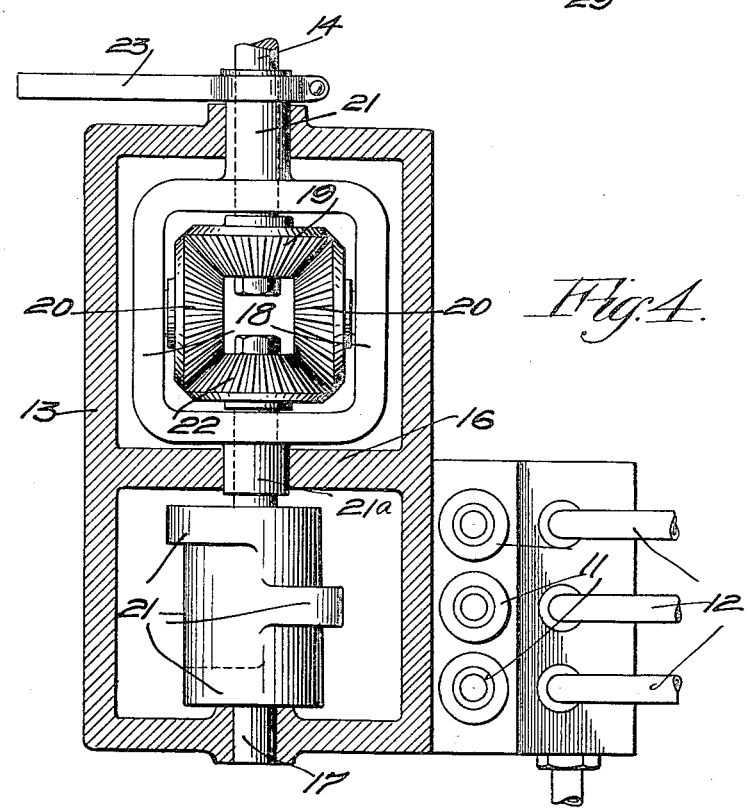
Fig. 4 is a section through the housing, which incloses the cam shaft and the differential coupling mechanism for the same.

One of the novel features of the present invention is the provision of means for manually and automatically regulating the quantity of fuel delivered by the pumps to the injecting nozzles, and furthermore to provide means for regulating the time of fuel injection. This is accomplished in the following manner:

Forming a portion of the crank case housing 2 or suitably secured thereto is a housing 13 through which extends a shaft 14, which is driven in unison with the crank shaft 4 by means of a pair of bevel gears 15. The housing 13 is divided into two sections by a cross web 16; similarly the shaft 14 extending through the casing is also divided into two sections to permit the formation of a cam shaft 17 and the introduction of a differential coupling 18. The shaft 17 has secured on its inner end a bevel gear 22, which intermeshes with a pair of bevel gears 20 carried by the differential coupling 18. This coupling consists of a square shaped yoke frame such as shown in Fig. 4, which is journaled in the housing 13 in a manner somewhat similar to a trunnion bearing, that is, a sleeve member 21 is formed on each end of the frame, the shaft 14 extending through one of said sleeves to support the gear 19, while the cam shaft 17 extends through the opposite sleeve to support the gear 22. The sleeves thus serve as bearing members for the shafts 14 to 17, and it is at the same time possible to transmit a turning movement to the frame 18 independently of the rotation of shaft 14; means for turning the frame 18 being provides in the form of a lever 23. This lever when turned one degree will either advance or retard the rotary movement of the cam shaft 17 two degrees, depending upon the direction in which the frame 18 is turned, this movement being transmitted through the gears 20 and the frame carrying the same.

Figure 3:
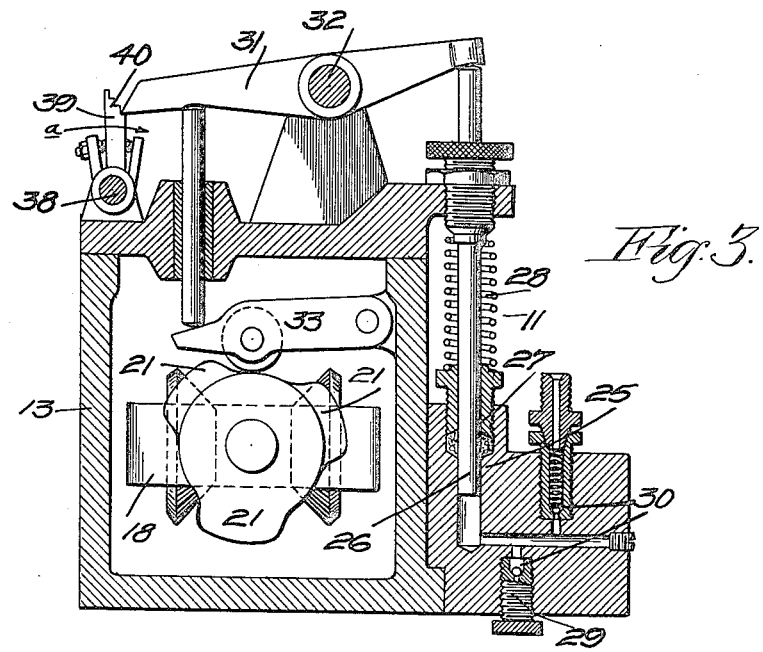
Fig. 3 is a vertical section through one of the fuel pumps and the cam arrangement for operating the same.

The fuel pump indicated at 11, see Figs. 3 and 4, may be constructed in any suitable manner, the cylinder portion of each pump being illustrated at 25, while the plungers are shown at 26. Each plunger passes through a stuffing box 27, and is normally held in a raised position by means of a spring 28. Fuel from any suitable source is admitted to the pump cylinders through piping connections 29, while the oil discharged by each pump is delivered to the spray nozzles 10 by means of the pipes 12 previously described, check valves 30 being placed in the several pipe connections to prevent the oil from backing up in the pipe lines, as will readily be understood. Each pump plunger is operated by means of a rocker arm 31, which is pivotally mounted as at 32 on top of the casing 13, these rocker arms being in turn operated by means of swinging arms 33, which are directly actuated by cams 21. With the engine running under normal load it can readily be seen that a rotary movement will be transmitted to the cam shaft 17 and the cams 21 carried thereby through the gears 15 and the gears 19, 20 and 22.

If it is desired to advance the time of injection it is only necessary to turn the lever 23 in one direction, while if it is desired to retard the time of injection, for instance, when idling, it is only necessary to turn the lever in the opposite direction. This movement of the lever either advances or retards the position of the cams 21, and therefore regulates the time of injection as the pump plungers by which the oil is injected are directly actuated by the cams 21.

For the purpose of regulating the amount or quantity of fuel injected, I have provided both an automatic and a manual control, the automatic control comprising a centrifugal governor 35, from which movement is transmitted through a rod 36 to rock a lever 37. This lever is secured on a shaft 38, and this shaft in turn carries a plurality of pawls 39, one pawl being mounted in alignment with each rocker arm 31. The upper end of each pawl is provided with a series of notches 40 with which the ends of the respective rocker arms are adapted to engage. For instance, if the speed of the engine passes a pre-determined point, it can readily be seen that the governor will act and immediately pull the rod 36 in a certain direction, this movement is, of course, transmitted to rock the arm 37 and the shaft 38 upon which it is secured. The pawls 39 will then be swung in the direction of arrow $a$ under the free ends of the rocker arms, for instance, to a point where the second notches will engage the rocker arms. The downward movement of the rocker arms are, in this manner, limited, and correspondingly, the upward movement of the plungers 26 of the respective oil pumps. The quantity of oil taken on the suction stroke by the respective pumps is thus reduced, as the plungers are not permitted to travel their complete stroke, and the quantity of fuel injected on the reverse movement of the plungers is therefore lessened, or the quantity of oil injected reduced; it can, therefore, be seen that the quantity of fuel injected can be automatically regulated by the governor, or it may be manually regulated by connecting the arm 37 with the link 41, which may be extended to a point within convenient reach of the operator, a similar link or rod 42 being employed to permit the differential coupling to be advanced or retarded as previously described when it is desired to regulate the time of fuel injection, the link 42 being, in this instance, connected with a bell crank 43, and a second link 44, which is directly connected with the lever 23.

From the foregoing description it can be seen that means has been provided for regulating the time of injection, and also for automatically and manually regulating the quantity of oil injected. Idling of the engine is, in this manner, permitted, thereby rendering it possible to successfully operate the engine whether it is running under full load or idling. This is a feature that is of great importance in connection with portable and traction engines, as it often happens that the load is entirely released, or so reduced, that the full engine power is not required.

Another important feature of the present invention is the provision of the magneto 8 and the spark plug 7. These are for the purpose of permitting immediate starting of the engine, whether hot or cold, without resorting to the necessity of heating the hot bulbs. This is accomplished by passing a high gravity oil through the injecting pumps, for instance, a fuel like gasoline or distillate. This fuel when injected is highly voltile, and can therefore be readily ignited by the spark plugs 7 when the engine is turned over. The engine can, therefore, be immediately started, whether hot or cold, and will continue running with the high gravity oil until the bulbs 6 have become sufficiently warm, then it is possible to gradualy switch over to the low gravity fuel oil as the hot bulbs, when completely heated, will then take care of or ignite the heavier oil when injected.

Another feature of the present invention is the provision of means for reversing the engine. This is accomplished by the differential coupling previously described. Due to the fact that said coupling or the frame 18 may be turned through an arc of at least forty-five degrees. To obtain the proper operation of the fuel injecting pumps when reversing the engine, it is necessary that the cam shaft be advanced about ninety degrees. This is accomplished by turning the frame 18 forty-five degrees, the pawls 40 having previously been moved to a position where they will hold the rocker arms out of engagement with the cam operating lifting mechanism, so that no oil will be injected while the engine is slowing down to reverse. The minute, however, that the cam shaft has been advanced the proper number of degrees to permit reversing, it will only be necessary to swing the pawls out of engagement with the rocker arms to permit the pumps to again inject oil, and whichever piston is then at half stroke will receive the injection of fuel, and the ignition of said fuel will then cause the engine to reverse. With the reversal of the engine the cam shaft also reverses and double injection of fuel at the time of reversing is prevented, first, because the pumps are inactive, and secondly, because the cams 21 have a width of about ninety degrees at the base. This width of the cams also automatically advances the time of injection in all cylinders to about running position after reversal is accomplished.

An engine of the semi-Diesel type controlled in the manner heretofore described has proven so flexible and readily controlled that it can be successfully employed for traction engines. It has also proven more efficient for marine use, as idling of the engine when so used is also of great importance when making a landing or when traveling at slow speeds.

By referring to Fig. 7, it will be seen that the engine is secured directly to the main frame of a tractor, the tractor here employed being provided with self-laying endless track chains, power being transmitted thereto through the gears indicated at 50, steering of the tractor being accomplished in the usual manner by a front wheel 51, and by means of side clutches 52. The several levers, for instance, for regulating the time of injection and the quantity of fuel injected, etc., may all be extended to a point where they may be conveniently reached by the operator. The engine is, therefore, at all times under perfect control, and it is furthermore possible to reverse without resorting to a reversing gear transmission as is now generally employed.

The engine may be started on compressed air if desired, whether it is to be run in the normal direction or to be reversed. In view of the fact that a high tension magneto of the Bosch type is employed it is further possible to idle the engine, as the spark generated assists in igniting the fuel when injected. The engine may also be provided with water injection, this being desirable, as it has a tendency to keep the cylinders free from carbon deposits, and also to keep the spark plug points clean.

I also wish it understood that various changes in form, proportions and minor details of construction may be resorted to within the scope of the appended claims, and that I do not wish to limit myself to the specific design and construction here shown.

By having a means for changing the time of fuel injection to the cylinders any gravity or flash test fuel may be employed ranging from gasoline to crude oil; also there is a most efficient time of injection for any specific number of revolutions per minute when the engine may be turning over. This also varies with the quality of fuel injected simultaneously. The manually controlled means accomplishes these results to any degree of exactness the operator may wish, the heavier oil having a slower rate combustion should be injected earlier in the cycle than the more volatile fuels.

Having thus described my invention, what I claim and desire to secure by Letters Patent is—

1. In a semi-Diesel engine, a pump for supplying fuel, means for operating said pump intermittently, a differential coupling the means to the engine, a revoluble housing for the differential, and positive means for controlling the position of the revoluble housing whereby the timing of the means for operating the pump intermittently may be varied to vary the time of the pump operation.

2. In a semi-Diesel engine, a pump for supplying fuel, revoluble means for operating said pump intermittently, a revoluble frame, a differential associated with said frame coupling said revoluble means to the engine, and means for moving the frame positively whereby the position of said frame may be varied and therewith the timing of the revoluble means for intermittently operating the pump.

3. In a semi-Diesel engine, a pump for supplying fuel, a cam for operating the pump, a pinion constrained to revolve with said cam, a shaft driven by the engine, a pinion constrained to revolve with said shaft driven by the engine, a frame revoluble relative to the pinion on the shaft and cam, pinions revolubly mounted in said frame and meshing with the pinions on the shaft and cam, and means for moving the frame positively for varying the position of the frame when the pinions are rotated whereby the timing of the cam is varied.

4. In a semi-Diesel engine, a pump for supplying fuel, a rocker arm for the pump, means operable from the engine for intermittently operating the rocker arm, a pawl having a stepped edge, and means for moving any of the steps of the pawl beneath the rocker arm whereby the oscillating movement of same may be varied and therewith the stroke of the pump.

5. In a semi-Diesel engine, a pump for supplying fuel, a rocker arm for the pump, means operable from the engine for intermittently operating the rocker arm, a pawl having a stepped edge, a shaft on which said pawl is free to turn, a bracket constrained to move with the shaft having jaws to each side of the pawl, springs interposed between the pawl and the jaws of the bracket, and means for moving the shaft whereby any step of the pawl may be brought into engagement with the rocker arm.

6. In a semi-Diesel engine, the combination with the cylinder and a spray nozzle for spraying fuel therein, of a pump adapted to deliver fuel to the nozzle, a shaft driven in unison with the crank shaft of the engine, a cam on said shaft, a rocker arm suitably fulcrumed and having one end engaging the plunger of said pump, means interposed between the cam and other end portion of rocker arm whereby the plunger is given its downward stroke, spring means for returning the plunger to its raised position, a pawl having a stepped edge, and means for moving any of the steps of the pawl beneath the rocker arm whereby the oscillating movement of same may be varied and therewith the stroke of the pump.

In testimony whereof I have hereunto set my hand in the presence of two subscribing witnesses.

WILLIAM H. FIREBAUGH, JR.

Witnesses:
W. H. FIREBAUGH,
S. S. RANKIN.